United States Patent
Li et al.

(10) Patent No.: US 11,732,185 B2
(45) Date of Patent: Aug. 22, 2023

(54) HIGH VISCOSITY FRICTION REDUCER FOR FRACTURING FLUID

(71) Applicant: ARAMCO SERVICES COMPANY, Houston, TX (US)

(72) Inventors: Wenwen Li, Pearland, TX (US); Rajesh Saini, Cypress, TX (US); Shawn Rimassa, Houston, TX (US)

(73) Assignee: SAUDI ARAMCO OIL COMPANY, Dhahran (SA)

( * ) Notice: Subject to any disclaimer, the term of this patent is extended or adjusted under 35 U.S.C. 154(b) by 0 days.

(21) Appl. No.: 17/371,736

(22) Filed: Jul. 9, 2021

(65) Prior Publication Data
US 2022/0010201 A1 Jan. 13, 2022

Related U.S. Application Data

(60) Provisional application No. 63/050,299, filed on Jul. 10, 2020.

(51) Int. Cl.
*C09K 8/90* (2006.01)
*C08F 251/00* (2006.01)

(52) U.S. Cl.
CPC .............. *C09K 8/90* (2013.01); *C08F 251/00* (2013.01); *C09K 2208/28* (2013.01)

(58) Field of Classification Search
None
See application file for complete search history.

(56) References Cited

U.S. PATENT DOCUMENTS

| | | | |
|---|---|---|---|
| 3,658,734 A | | 4/1972 | Pettitt |
| 4,400,496 A | * | 8/1983 | Butler .................. C08F 251/00 527/312 |
| 5,633,220 A | * | 5/1997 | Cawiezel ................ C09K 8/64 507/923 |
| 5,762,140 A | * | 6/1998 | Hardy .................. C09K 8/887 166/305.1 |
| 9,315,722 B1 | | 4/2016 | Jackson et al. |
| 2009/0145607 A1 | | 6/2009 | Li |

(Continued)

FOREIGN PATENT DOCUMENTS

CN 103540309 B 10/2015

OTHER PUBLICATIONS

Malhotra, J.P., et al., "Drag Reduction by Polymer-Polymer Mixtures", Journal of Applied Polymer Science, John Wiley & Sons, Inc., vol. 36, No. 4, Aug. 5, 1988, pp. 837-858 (22 pages).

(Continued)

*Primary Examiner* — John J Figueroa
(74) *Attorney, Agent, or Firm* — Osha Bergman Watanabe & Burton LLP

(57) ABSTRACT

A friction reducer includes a polysaccharide-graft-water-soluble polymer is provided. A polysaccharide in an amount of from about 0.1 to 50% by weight (wt. %) may make up the polysaccharide-graft-water-soluble polymer. A wellbore treatment fluid is provided that includes an aqueous base fluid and the friction reducer in an amount up to about 10% of the wellbore treatment fluid. A method of using a wellbore treatment fluid includes the step of introducing the wellbore treatment fluid as previously provided into a wellbore.

18 Claims, 4 Drawing Sheets

(56) References Cited

U.S. PATENT DOCUMENTS

| | | |
|---|---|---|
| 2009/0192051 A1 | 7/2009 | Carman |
| 2012/0157356 A1 | 6/2012 | Dawson et al. |
| 2013/0233545 A1 | 9/2013 | Mahoney et al. |
| 2014/0332214 A1 | 11/2014 | Zhou et al. |
| 2016/0053165 A1 | 2/2016 | Weaver et al. |
| 2016/0160117 A1* | 6/2016 | Vo .......................... C09K 8/68 507/210 |
| 2016/0186045 A1 | 6/2016 | Maguire-Boyle et al. |
| 2018/0051203 A1 | 2/2018 | Nguyen et al. |
| 2018/0094187 A1 | 4/2018 | Penland et al. |
| 2018/0155615 A1 | 6/2018 | Rahy et al. |
| 2018/0346803 A1 | 12/2018 | Dugonjic-Bilic et al. |
| 2019/0017203 A1 | 1/2019 | Andoh et al. |
| 2019/0112521 A1 | 4/2019 | McDaniel et al. |

OTHER PUBLICATIONS

International Search Report issued in corresponding International Application No. PCT/US2021/041091, dated Oct. 20, 2021 (4 pages).
Written Opinion issued in corresponding International Application No. PCT/US2021/041091, dated Oct. 20, 2021 (7 pages).

* cited by examiner

HIGH VISCOSITY FRICTION REDUCER FOR FRACTURING FLUID

CROSS-REFERENCE TO RELATED APPLICATIONS

This Application claims priority from U.S. Patent Application No. 63/050,299, filed Jul. 10, 2020, the contents of which are incorporated by reference in their entirety.

BACKGROUND

Well stimulation enables the improved extraction of hydrocarbon reserves that conventional recovery processes, such as gas or water displacement, cannot access. One well stimulation technique that is widely employed is hydraulic fracturing, which involves the injection of a fluid into a formation at a pressure that is greater than the fracture pressure. This increases the size and extent of existing fractures within the formation and may create new fractures.

One method of hydraulic fracturing that is widely used, particularly in unconventional reservoirs, is slickwater fracturing. Rather than gels or other high viscosity fluids, slickwater fracturing involves the use of water as a treatment fluid, generally with additives. One key additive is a "friction reducer" that can reduce the friction generated as the fluid flows through restrictions. As compared to other hydraulic fracturing techniques, slickwater fracturing can offer benefits that include a simple operation, cost savings, and the generation of a complex fracturing network that increases the total stimulated reservoir volume.

SUMMARY

This Summary is provided to introduce a selection of concepts that are further described in the Detailed Description. This Summary is not intended to identify key or essential features of the claimed subject matter, nor is it intended to be used as an aid in limiting the scope of the claimed subject matter.

In one aspect, embodiments disclosed relate to a friction reducer comprising a polysaccharide-graft-water-soluble polymer (polysaccharide-g-water-soluble polymer).

In another aspect, embodiments disclosed relate a wellbore treatment fluid including an aqueous base fluid and a friction reducer, where the friction reducer includes polysaccharide-graft-water-soluble polymer. The amount of the friction reducer in the wellbore treatment fluid is in a range of from about 0.01 to 10 wt. % (weight percent).

In a further aspect, embodiments disclosed relate to a method of using a wellbore treatment fluid in a wellbore, the method including introducing the wellbore treatment fluid into the wellbore. The wellbore treatment fluid may comprise the wellbore treatment fluid previously described.

Other aspects and advantages of the claimed subject matter will be apparent from the description, the drawings, and the claims that follow.

DETAILED DESCRIPTION

Figure 1:
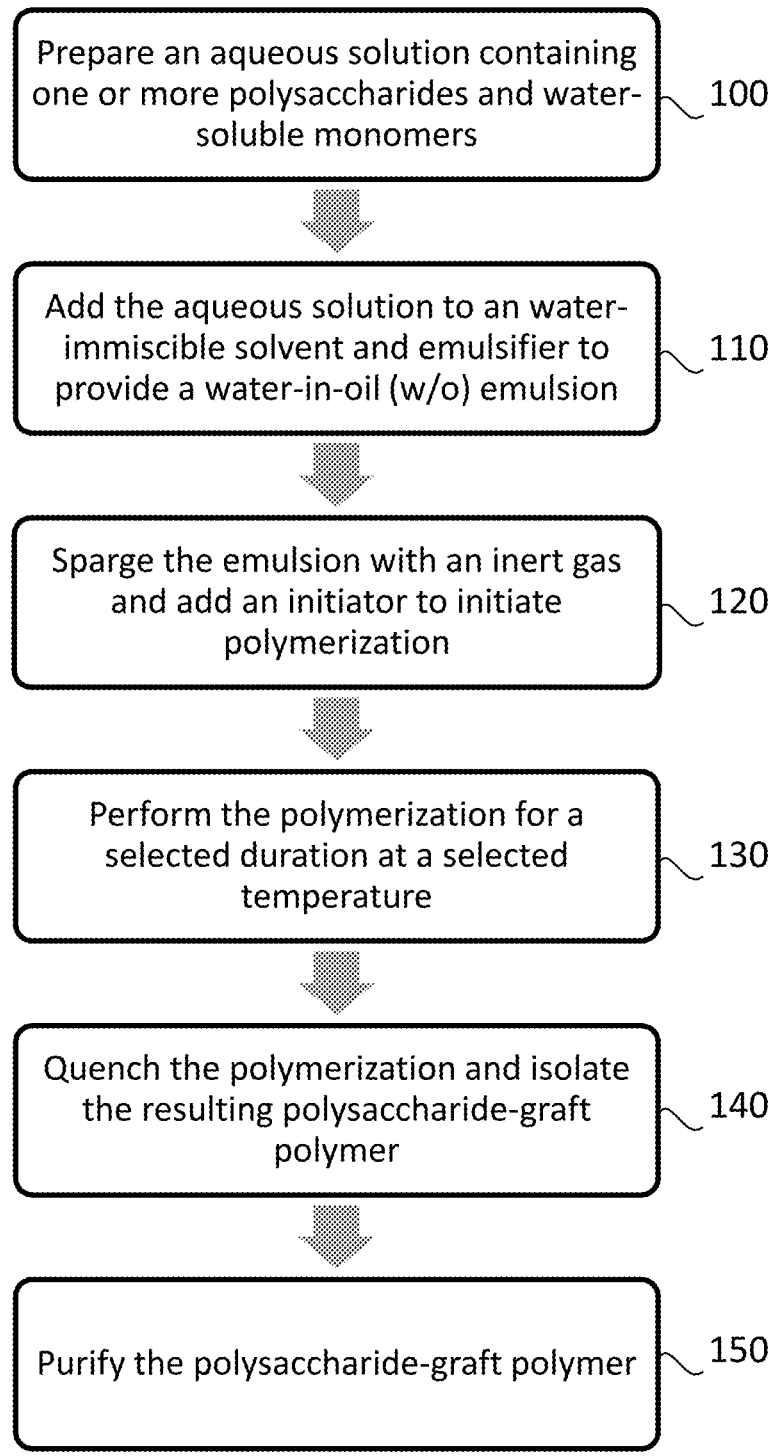
FIG. 1 is a schematic representation of a method of producing a friction reducer according to one or more embodiments.

Slickwater fracturing generally requires an injection rate that exposes the friction reducers to a shear rate that can deteriorate the friction reducer. Additionally, conventional friction reducers may be inefficient and not readily compatible in high salinity environments, such as synthetic or natural seawaters, brines, or produced waters. Fresh water has generally been used as the base fluid for slickwater fracturing. However, obtaining enough fresh water is often challenging. Slickwater treatment fluids also often have a limited proppant transporting capacity due to their low viscosity. Large amounts of fresh water may be required to place enough proppant in a fracture consequently.

One or more embodiments generally relate to friction reducers, their preparation, wellbore treatment fluids that contain friction reducers, and methods of using the wellbore treatment fluids. Generally, the friction reducers of one or more embodiments disclosed comprise one or more polysaccharide-graft polymers.

Advantageously, the friction reducers in accordance with one or more embodiments may provide an improved salt tolerance with a well-maintained viscosity profile in synthetic seawater while also delivering a high friction reduction in both elevated and reduced salinity environments.

Friction Reducer

A friction reducer in accordance with one or more embodiments comprise a hybrid polymer. The friction reducer may, in turn, comprise a first polymeric component and a second polymeric component. In one or more embodiments, the first polymeric and the second polymeric components may be covalently bonded together in a graft configuration ("grafted"). In one or more embodiments, the first polymeric component may comprise a polysaccharide. In one or more embodiments, the second polymeric component may be a water-soluble polymer. The hybrid polymer may be a polysaccharide-graft-water-soluble polymer. In one or more embodiments, the water-soluble polymer may be a natural or non-synthetic water-soluble polymer. In one or more embodiments, the water-soluble polymer may be a synthetic water-soluble polymer.

The useful polysaccharide for incorporation as part of one or more embodiments of friction reducer is not particularly limited. In one or more embodiments, the polysaccharide may be any suitable polysaccharide that meets the objectives of the friction reducer. The polysaccharide may be a homopolymer or a heteropolymer. A heteropolymer may be a copolymer. "Copolymer" is defined as being a polymer comprised of two or more different types of reacted monomers present in the same polymer chain distributed in a block, random, or alternating configuration, for example, ethylene oxide and propylene oxide. The polysaccharide may be in a linear or branched configuration.

A person of ordinary skill in the art will, with the benefit of this disclosure, appreciate that the choice of a polysaccharide will influence the properties of the resultant friction reducer. For instance, in one or more embodiments, a polysaccharide with a longer chain length may provide increased viscosity as well as salt tolerance. In turn, if a polysaccharide with a shorter chain length is utilized, a polymer having a bulky functional group may be grafted, which may enable the hybrid polymer chain to remain extended in the aqueous fluid and providing enhanced salt tolerance over one that does not have such a functional group. The final grafted copolymer properties may be tuned by controlling the polysaccharide, the grafted polymer structure, and the chain length. In a polysaccharide with a shorter chain length is utilized, one may graft a polymer with a bulky side group to the polysaccharide to ensure that the hybrid polymer remaining in an extended form in the solution. Although not wanting to be bound by theory, an extended for of polymer in the solution is believed to be beneficial for improving friction reduction performance and viscosity.

In one or more embodiments, the polysaccharide may be one or more selected from the group comprising guar gum, starch, cellulose, dextran, xanthan, chitin, dextran, scleroglucan, chitosan, gellan gum, arabic gum, alginate, curdlan, hyaluronic acid, lentinan, levan, pullulan, schizophyllan, stewartan, succinoglycan, welan, derivatives thereof, and combinations thereof. A "derivative" and derivations thereof means that the original chemical has been chemically modified in some manner but retains most of the physical and chemical characteristics of the original chemical, for example, graphene and graphene oxide (a derivative of graphene).

In one or more embodiments, the polysaccharide may have a degree of polymerization in the range of from about 100 to 100,000. For example, the polymeric component may have a degree of polymerization that is of an amount ranging from a lower limit of any of 100, 200, 500, 1,000, 1,500, 2,000, 3,000, 4,000, and 5,000 to an upper limit of any of 10,000, 20,000, 30,000, 40,000, 50,000, 60,000, 75,000, and 100,000, where any lower limit can be used in combination with any mathematically-compatible upper limit.

In one or more embodiments, the polysaccharide may have a viscosity average molecular weight in the range of from about 16 kilodaltons (kDa) to 16,000 kDa. For example, the polymeric component may have a viscosity average molecular weight that is of an amount ranging from a lower limit of any of 16, 30, 50, 100, 500, 1,000, and 5,000 kDa to an upper limit of any of 500, 1,000, 5,000, 10,000, and 16,000 kDa, where any lower limit can be used in combination with any mathematically-compatible upper limit.

The polysaccharide portion of the polysaccharide-graft-water-soluble polymer is present in an amount in a range of from about 0.1 to 50% by weight (wt. %) of the friction reducer. In one or more embodiments, the polysaccharide-graft polymer may contain the polysaccharides in an amount ranging from a lower limit of any of 0.1, 0.2, 0.5, 0.8, 1.0, 2.0, 3.0, and 5.0 wt. % to an upper limit of any of 10, 12.5, 15, 17.5, 20, 25, 30, 40, and 50 wt. %, where any lower limit can be used in combination with any mathematically-compatible upper limit.

The water-soluble polymer of one or more embodiments is not particularly limited and may be any suitable water-soluble polymer. The water-soluble polymer may be a homopolymer or a copolymer. The water-soluble polymer may be linear or branched configuration. A person of ordinary skill in the art will, with the benefit of this disclosure, appreciate that the choice of water-soluble polymer will influence the properties of the resulting friction reducer. Generally, the viscosity of ionic friction reducers may decrease in increasingly saline environments. Divalent and multivalent ions may affect the friction reducer performance to a greater extent than monovalent ions. Divalent and multivalent ions may interact with anionic polymers to a greater degree than monovalent ions, which may prevent the friction reducer from hydrating and reducing the friction reduction value. Comparatively, non-ionic friction reducers may typically have a much greater salt tolerance than ionic friction reducers.

The water-soluble polymers of one or more embodiments may be a homopolymer, where the homopolymer is a polymerization product of a water-soluble monomer. In one or more embodiments, the water-soluble monomer is selected from the group comprising acrylamides, acrylates, acetate, acetamides, formamides, derivatives thereof, and combinations thereof. In one or more embodiments, the homopolymer may be derived from acrylamide, (meth)acrylamide, N,N-dimethylacrylamide, dimethyl(meth)acrylamide, $C_1$-$C_3$N-alkyl(meth)acrylamide, N-vinylpyrrolidone, N-vinyl acetamide, 4-acryloylmorpholine, N-isopropylacrylamide, N-(hydroxymethyl)acrylamide, N-(hydroxyethyl)acrylamide, N-[tris(hydroxymethyl)methyl]acrylamide, N-vinylpyrralidone, N-vinyl acetate, and N-vinyl formamide.

The water-soluble polymer of one or more embodiments may be a copolymer, as defined previously. In one or more embodiments, the copolymer is a polymerization reaction product of two or more water-soluble monomers selected from the group described previously.

In one or more embodiments, the copolymers may be derived from the reaction of one or more water-soluble monomer selected from the group described previously and with one or more functional monomers. A functional monomer may be a monomer that is a cationic monomer. Examples of cationic monomers include, but are not limited to, (meth)acrylamidopropyltrimethyl ammonium halides, (meth)acryloyloxyethyltrimethyl ammonium halides, (meth)acryloyloxyethyltrimethyl ammonium methyl sulfates, diallyl dimethyl ammonium halides, diallylamines, methyldiallylamines, dimethylaminoethylmethacrylates, and dimethylaminopropylmethacrylamides, derivatives thereof, and combinations thereof.

A functional monomer may be an anionic monomer. Examples of anionic monomers include, but are not limited to, (meth)acrylic acid and its salts, such as acrylic acid, sodium acrylate, ammonium acrylate, methacrylic acid, sodium methacrylate; 2-acrylamido-2-methylpropanesulfonic acid (AMPS) and its sodium salt; vinyl sulfonic acid and its salts, such as sodium vinyl sulfonate; styrene sulfonic acid and its salts; sulfomethylated acrylamide; allyl sulfonate; vinylphosphonic acid; allylphosphonic acid; and phosphonomethylated acrylamide, derivatives thereof, and combinations thereof.

The water-soluble polymers of one or more embodiments may comprise units derived from the functionalized monomers in an amount in the range of from about 1 to 60% by weight (wt. %). In one or more embodiments, the water-soluble polymers may contain the functionalized monomer units in an amount ranging from a lower limit of any of 1, 2, 5, 10, 15, 20, and 25 wt. % to an upper limit of any of 5, 10, 15, 20, 25, 30, 40, 50, and 60 wt. %, where any lower limit can be used in combination with any mathematically-compatible upper limit.

In one or more embodiments, the polysaccharide may have a degree of polymerization in the range of from about 100 to 100,000. For example, the polymeric component may have a degree of polymerization that is of an amount ranging from a lower limit of any of 100, 200, 500, 1,000, 1,500, 2,000, 3,000, 4,000, and 5,000 to an upper limit of any of 10,000, 20,000, 30,000, 40,000, 50,000, 60,000, 75,000, and 100,000, where any lower limit can be used in combination with any mathematically-compatible upper limit.

The polysaccharide-graft-water-soluble polymer of one or more embodiments may comprise the water-soluble polymer in an amount in the range of from about 50 to 99.9% by weight (wt. %). In one or more embodiments, the polysaccharide-graft polymer may contain the water-soluble polymer in an amount ranging from a lower limit of any of 50, 55, 60, 65, 70, 75, and 80 wt. % to an upper limit of any of 70, 75, 80, 85, 90, 95, 99, and 99.9 wt. %, where any lower limit can be used in combination with any mathematically-compatible upper limit.

In one or more embodiments, the polysaccharide-graft polymer may have a viscosity average molecular weight in the range of from about 1,000 kilodaltons (kDa) to 30,000 kDa. For example, the polymeric component may have a viscosity average molecular weight that is of an amount ranging from a lower limit of any of 1,000, 2,000, 3,000, 5,000, 7,000, 10,000, 12,000, and 15,000 kDa to an upper limit of any of 5,000, 10,000, 12,000 15,000, 20,000, 25,000, and 30,000 kDa, where any lower limit can be used in combination with any mathematically-compatible upper limit.

In one or more embodiments, the friction reducer may be highly tolerant of monovalent and divalent ions, such as, but not limited to, $Na^+$, $K^+$, $Ca^{2+}$, and $Mg^{2+}$, in an aqueous solution. This salt tolerance may be exhibited by the total dissolved solids (TDS) of a friction reducer-containing aqueous solution only having a very small influence on the viscosity of the solution across a friction reducer loading in a range of from about 0.05 to 3 wt. %. For instance, in one or more embodiments, the viscosity value of a friction reducer-containing aqueous solution having a TDS of more than 50,000 milligrams per litre (mg/L), such as 57,000 mg/L, may be within 25%, within 20%, within 10%, within 5%, or within 1%, of a viscosity value for a friction reducer-containing aqueous solution having a TDS of less than 1,000 mg/L measured at a rotational speed of 300 RPM (rotations per minute). The viscometer may be a Model 35 Viscometer (FANN).

The total dissolved solids (TDS) of synthetic seawater may be about 57,000 mg/L. The TDS of deionized water (DI) is less than 1000 mg/L.

In one or more embodiments, an amount of difference in a rotational viscosity value for a first aqueous solution comprising the friction reducer as compared to a second aqueous solution comprising the friction reducer is in a range of from about 0.01 to 25% measured at a rotational speed of 300 RPM, where the concentration of the friction reducer in both the first aqueous solution and the second aqueous solution is the same and where a total dissolved solids (TDS) in the first aqueous solution is greater than 50,000 mg/L and in the second aqueous solution is less than 1,000 mg/L.

In one or more embodiments, the inclusion of the friction reducer in an aqueous solution may reduce the friction associated with the flow of the aqueous solution as compared to a corresponding solution that does not contain the friction reducer. In one or more embodiments, at a flow rate of 4 gallons per minute, an aqueous solution at synthetic sweater salinity including the friction reducer in a loading amount of 0.05 wt. % may have a friction reduction of 50% or more, 60% or more, or 70% or more, relative to a corresponding solution that does not contain the friction reducer. In one or more embodiments, the aqueous solution including the friction reducer may have a friction reduction ranging from a lower limit of any of 50, 55, 60, 65, 70, and 75% to an upper limit of any of 75, 80, and 85% compared to a corresponding solution without the friction reducer, where any lower limit can be used in combination with any mathematically-compatible upper limit. In one or more instances, the ability of the friction reducer to reduce friction may be unaffected by the presence of dissolved salts in the aqueous solution. In one or more embodiments, the amount of friction reduction in an aqueous solution comprising 0.5 wt. % of the friction reducer as compared to a similar aqueous solution that does not comprise the friction reducer is in a range of from about 50% to 85%.

Method of Preparing a Friction Reducer

In one or more embodiments, the friction reducer may be prepared by inverse-emulsion polymerization. FIG. 1 is a schematic representation of a method of producing a friction reducer according to one or more embodiments. All components and quantities discussed in relation to the method correspond to those discussed previously.

The method 100 may include combining a first aqueous solution with a second aqueous solution to form a combined aqueous solution 110. A combined aqueous solution is prepared that comprises a first polymeric component and one or more monomers that will constitute the second polymeric component. In one or more embodiments, a first aqueous solution comprising the first polymeric component, such as a polysaccharide. The second aqueous solution comprises a water-soluble monomer capable of forming a water-soluble polymer. The aqueous solutions may be prepared separately and then combined to form the combined aqueous solution.

The combined aqueous solution may further comprise any suitable reagents known to a person of ordinary skill in the art. Such reagents may include chelating agents, such as ethylenediaminetetraacetic acid (EDTA), and salts, such as sodium chloride.

The method 100 may include introducing a water-immiscible solvent and an emulsifier into the combined aqueous solution such that a water-in-oil (w/o) emulsion forms 120. The water-immiscible solvent is not particularly limited and may be any suitable solvent known to a person of ordinary skill in the art. The water-immiscible solvent may be a hydrocarbon solvent. Examples of useful hydrocarbon solvents include, but are not limited to, hydrotreated petroleum distillates, such as fractions of crude oil like mineral oil, hydrotreated paraffins, hydrotreated naphthalenes, cycloalkanes, and alkanes. The hydrocarbon solvent of one or more embodiments may be commercially available from Shell (ShellSol D60, ShellSol D80), Sasol Limited (LPA 210, LPA 170) and ExxonMobil Chemical (EXXSOL™ D60, EXXSOL™ D80).

The emulsifier is not particularly limited. The emulsifier may be any suitable emulsifier known to a person of ordinary skill in the art to generate a water-in-oil emulsion, such as sorbitan monostearate and a polysorbate.

The method 100 may include introducing an inert gas into the w/o emulsion to form a deoxygenated emulsion 130. Non-limiting examples of inert gases include nitrogen and argon. The inert gas may be introduced by way of a sparger submerged in the w/o emulsion. The sparging may be performed for 15 minutes or more. The purpose of sparging is to remove oxygen from the reaction media. An inert environment for free-radical polymerization is preferable. Removing oxygen prevents the formation of free-radical oxygen.

The method 100 may include introducing a redox initiator into the emulsion to initiate polymerization of the second polymeric component and the formation of the friction reducer 140. The initiator is not particularly limited and may be any suitable initiator known to a person of ordinary skill in the art. In one or more embodiments, the initiator may be metered into the emulsion, such as by adding a dilute solution of the initiator via drip-feeding. In one or more embodiments, polymerization may be initiated by the addition of a potassium persulfate in combination with the redox initiator.

The polymerization may occur for a polymerization duration. The polymerization duration is not particularly limited and may be any period known by a person of ordinary skill in the art to be suitable. In one or more embodiments, the polymerization duration is in a range of from about 1 to 3 hours.

The polymerization may occur at a polymerization temperature. The polymerization temperature is not particularly limited and may be any temperature known by a person of ordinary skill in the art to be suitable. In one or more embodiments, the polymerization temperature is in a range of from about 35° C. to about 50° C.

The method 100 may include chasing the polymerization 140. After the polymerization duration has elapsed, the polymerization is quenched, and the reactor is cooled. The quenching is not particularly limited and may utilize any known method by a person of ordinary skill in the art. In one or more embodiments, sodium metabisulfite (SMBS) may be introduced as an aqueous solution to the emulsion with the reaction product friction reducer to scavenge any unreacted second polymeric component.

The method 100 may include isolation and purification of the friction reducer from the emulsion 150. The purification of one or more embodiments may involve precipitating a polysaccharide-graft polymer friction reducer from a polar, non-protic solvent, such as acetone. The resultant embodiment friction reducer is dried.

Wellbore Treatment Fluid

One or more embodiments of the present disclosure relate to wellbore treatment fluids and may include, for example, a water-based wellbore treatment fluid. In one or more embodiments, the wellbore treatment fluid may comprise a fracturing fluid for use in slickwater fracturing as previously described.

A wellbore treatment fluid of one or more embodiments may comprise an aqueous base fluid. The aqueous base fluid may include at least one of a natural or synthetic water, or a combination thereof. Examples of water include, but are not limited to, fresh water, natural and synthetic seawaters, natural and synthetic brines, brackish, formation, produced, and mixtures of waters thereof.

The aqueous base fluid may be synthetically formulated or naturally contain one or more salts. The salts may include, but are not limited to, alkali metal and alkaline earth metal halides, hydroxides, carbonates, bicarbonates, sulfates, and phosphates. Salts may include both organic and inorganic components. Salts may include ionic compounds that produce disassociated ions of, for example, sodium, calcium, aluminium, magnesium, potassium, strontium, lithium, halides, carbonates, bicarbonates, sulfates, chlorates, bromates, nitrates, oxides, and phosphates. Examples of salts include alkali metal halides, alkali metal sulfates, alkaline earth metal halides, and alkali metal bicarbonates. Specific salts include, but are not limited to, sodium chloride, calcium chloride, magnesium chloride, sodium sulfate, and sodium bicarbonate.

The aqueous base fluid may have a total dissolved solids (TDS) of 1,000 milligrams per litre (mg/L) or more, such as 10,000 mg/L or more, such as 50,000 mg/L or more, such as 57,000 mg/L, or such as 100,000 mg/L or more. In one or more embodiments, the aqueous fluid may have a TDS of an amount ranging from a lower limit of any of 1,000, 5,000, 10,000, 30,000, 50,000, 70,000, 80,000, 90,000, and 100,000 mg/L to an upper limit of any of 60,000, 75,000, 100,000, 150,000, 200,000, 250,000, and 350,000 mg/L, where any lower limit can be used in combination with any mathematically-compatible upper limit. In one or more embodiments, the aqueous base fluid is a synthetic or natural seawater or brine where the TDS of the aqueous base fluid is in a range of from about 1,000 to 350,000 mg/L TDS. In some such embodiments, the seawater or brine is synthetic. The maximum concentration is determined by the solubility of the salt in water as well as with any other salts and impurities present.

A person of ordinary skill in the art would appreciate with the benefit of this disclosure that the density of aqueous fluid, and, in turn, of the wellbore treatment fluid, may be affected by the salt concentration of the aqueous fluid.

In one or more embodiments, wellbore treatment fluids may contain one or more of the friction reducers described previously. The friction reducer of the one or more embodiments of the wellbore treatment fluid may be present in a range of from about 0.01 to 10 wt. %, such as about 0.05 to 5 wt. %, such as from about 0.3 to 0.9 wt. %. For example, the wellbore treatment fluid may contain the friction reducer in an amount ranging from a lower limit of any of 0.01, 0.1, 0.2, 0.3, 0.4, 0.5, 0.7, and 1.0 wt. % to an upper limit of any of 0.3, 0.5, 0.7, 1.0, 2.5, 5.0, 7.5, and 10 wt. %, where any lower limit can be used in combination with any mathematically-compatible upper limit.

Other additives may be included in the wellbore treatment fluids of the present disclosure. Such additives may include, but are not limited to, proppants, viscosifiers, pH adjusting agents, wetting agents, corrosion inhibitors, scale inhibitors, oxygen scavengers, anti-oxidants, biocides, surfactants, dispersants, interfacial tension reducers, mutual solvents, thinning agents, breakers, crosslinkers, and combinations thereof. The identities and use of the additives are not particularly limited and may be any suitable additive known to a person of ordinary skill in the art. One of ordinary skill in the art will, with the benefit of this disclosure, appreciate that the inclusion of a particular additive will depend upon the desired application and properties of one or more embodiments of the wellbore treatment fluid.

As described, a wellbore treatment fluid may include a weighing agent. Weighting agents suitable for use in the wellbore treatment fluids of one or more embodiments include, but are not limited to, bentonite, barite, dolomite, calcite, aragonite, iron carbonate, zinc carbonate, manganese tetroxide, zinc oxide, zirconium oxide, hematite, ilmenite, lead carbonate, and combinations thereof.

A wellbore treatment fluid of one or more embodiments may include a proppant. A proppant is a material that may be transported into the wellbore by the one or more embodiments of the wellbore treatment fluid and deposited in an induced fracture of a formation. In doing so, the induced fracture remains at least partially open during or after completion of the treatment or removal of the remaining wellbore treatment fluid. In one or more embodiments, the proppant may include, but is not limited to, sand, polymer-coated sand, gravel, glass, polymers, ceramics, silica, alumina, carbon black, graphite, mica, titanium dioxide, metasilicate, calcium silicate, metal oxides, kaolin, talc, and fly ash. In one or more embodiments, the proppant may comprise particle sizes distributed around one or more different average particle sizes.

The wellbore treatment fluid of one or more embodiments may comprise a proppant in an amount in a range of from about 1 to 10 pounds per gallon (lb/gal). For example, the wellbore treatment fluid may contain the proppant in an amount ranging from a lower limit of any of 1, 2, 3, 4, and 5 lb/gal, to an upper limit of any of 4, 5, 7, 9, and 10 lb/gal, where any lower limit can be used in combination with any mathematically-compatible upper limit.

A person of ordinary skill in the art will appreciate, with the benefit of this disclosure, that the physical properties of a wellbore treatment fluid are important in determining the suitability of the fluid for a given application.

The viscosity of the wellbore treatment fluid may be slightly affected by its TDS content. For instance, in one or more embodiments, the viscosity value of a wellbore treatment fluid having a TDS of around 50,000 mg/L), such as 57,000 mg/L, may be within 25%, within 20%, within 10%, within 5%, or within 1%, of a viscosity value for a corresponding wellbore treatment fluid having a TDS of less than 1,000 mg/L, each measured a rotational speed of 300 RPM. The viscometer may be a Model 35 Viscometer (FANN).

In one or more embodiments, the inclusion of a friction reducer as described previously may reduce the friction associated with the flow of the wellbore treatment fluid compared to a corresponding wellbore treatment fluid that does not contain the friction reducer.

Method of Preparing a Wellbore Treatment Fluid

Figure 2:
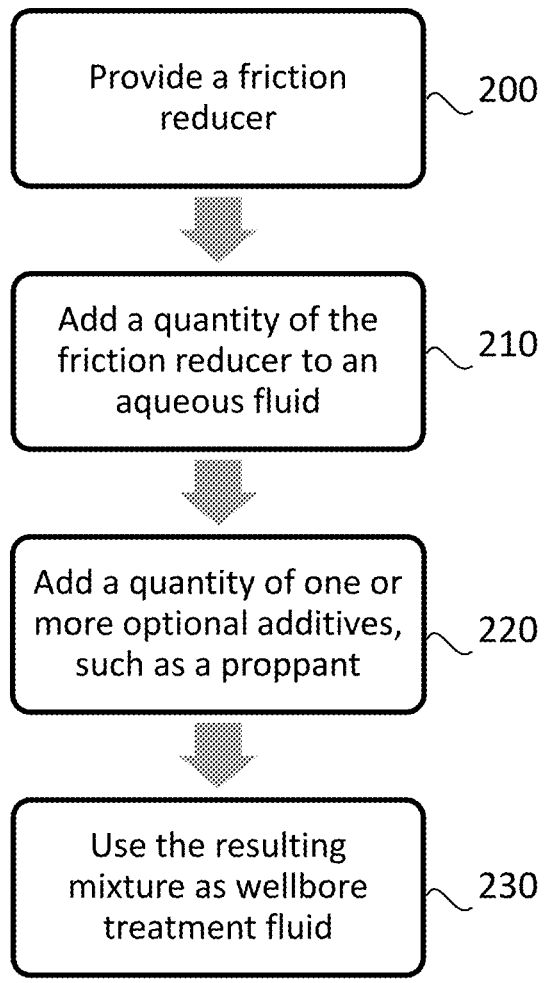
FIG. 2 is a schematic representation of a method of producing a wellbore treatment fluid according to one or more embodiments.

FIG. 2 is a schematic representation of a method of producing a wellbore treatment fluid according to one or more embodiments. All components and quantities discussed in relation to the method correspond to those discussed previously.

The method 200 may include providing one or more embodiments of the friction reducer 210. For example, the friction reducer may be provided by being prepared by inverse emulsion polymerization, as described previously associated with method 100 of FIG. 1. In another instance, the friction reducer may be purchased and made available for use. In one or more embodiments, the friction reducer may comprise a polysaccharide-graft polymer.

The method 200 may include introducing an amount of friction reducer into an aqueous fluid 220. The aqueous fluid includes a water and may include salts and dissolved solids as previously described.

The method 200 may include introducing an amount of an additive into the aqueous fluid such that the wellbore treatment fluid forms 230. The wellbore treatment fluid may include additives as previously described, such as weighing agents and proppants.

Method of Use a Wellbore Treatment Fluid

Wellbore treatment fluids of one or more embodiments may be introduced into a wellbore or subterranean formation using techniques known to a person of ordinary skill in the art.

In one or more embodiments, the wellbore treatment fluid comprising the friction reducer is utilized as a slickwater fracturing fluid. A slickwater fracturing fluid is useful to stimulate hydrocarbon production from a subterranean zone, such as a reservoir or a hydrocarbon-bearing formation. For example, multiple barrels of the wellbore treatment fluid are prepared, such as by way of method 200, where each barrel contains components as previously described. The multiple barrels of the wellbore treatment fluid are then introduced into a reservoir at a pressure greater than the fracture pressure of the reservoir. In such an instance, the reservoir is in fluid communication with the wellbore.

In one or more embodiments, the wellbore treatment fluid is introduced at a pressure greater than the fracture pressure of the hydrocarbon-bearing formation in fluid communication with the wellbore.

In one or more embodiments, the friction reducer is selected from the group consisting of starch-g-polyacrylamide, guar-g-polyacrylamide, and combinations thereof. In one or more embodiments, the aqueous base fluid is a natural or synthetic seawater or brine.

In one or more embodiments, the wellbore treatment fluid may further comprise proppants. By introducing the slickwater fracturing fluid, the proppants may be deposited in the cracks and fissures created by introducing the fracturing fluid into a reservoir at a pressure greater than the fracture pressure of the reservoir. The result is that an increase in permeability and hydrocarbon flow may occur from the treated reservoir. In one or more embodiments, the fracturing process may be repeated. In subsequent treatments, the subsequent fracturing process may involve the use of a well treatment fluid having a different composition than the first well treatment fluid.

EXAMPLES

The following examples are merely illustrative and should not be interpreted as limiting the scope of the present disclosure.

Example 1: Starch-Graft-Polyacrylamide

An aqueous solution was prepared by dissolving 90.3 grams (g) of acrylamide (a water-soluble monomer), 9.1 g of potato starch (a polysaccharide), 0.035 g of EDTA, 3.75 g of NaCl, and 0.375 g of potassium persulfate in 150 g of water in a 500 millilitre (mL) beaker. Separately, 150 g of a hydrocarbon solvent (LPA 210 (Sasol)) and 22.5 g of a sorbitan monoester and polysorbate emulsifier were added to a 1 litre (L) reaction kettle equipped with a thermocouple, a nitrogen inlet and outlet, and a mechanical stirring rod. Each composition was separately mixed. The aqueous solution was added to the reaction kettle during overhead agitation to form a water-in-oil (w/o) emulsion. The resulting emulsion was sparged with nitrogen for 30 to 40 minutes under mechanical agitation.

To the emulsion, 5.5 g of a SMBS solution (5 wt. % in water) was slowly introduced to the emulsion to initiate polymerization after sparging was performed. The temperature was maintained between 38 and 42° C. The polymerization reaction was permitted to proceed for approximately 120 minutes. The polymerization reaction was quenched by the addition of 0.75 g of a SMBS solution (25 wt. % in water) to the reactor to scavenge any remaining monomers. The reaction mixture cooled for approximately 30 minutes. The final product was isolated, precipitated from acetone, and dried to yield a solid polysaccharide-g-polyacrylamide friction reducer.

Example 2: Guar-Graft Polyacrylamide

An aqueous guar solution was prepared by mixing 3 g of guar (a polysaccharide) with 200 g of water. The guar solution was mixed with 120 g of acrylamide, 0.037 g of EDTA, 3.75 g of NaCl and 0.25 g of potassium persulfate in a 500 mL beaker. Separately, 100 g of hydrocarbon solvent (LPA 210 (SASOL)) and 15 g of a sorbitan monoester and polysorbate emulsifier were added to a 1 L reaction kettle equipped with a thermocouple, a nitrogen inlet and outlet, and a mechanical stirring rod. Each composition was separately mixed. The aqueous solution was added to the reaction kettle under overhead agitation to form a water-in-oil (w/o) emulsion. The resulting emulsion was sparged with nitrogen for 30 to 40 minutes under agitation.

To the emulsion, 6 g of SMBS solution (3 wt. % in water) was slowly fed to the emulsion to initiate polymerization after sparging was performed. The temperature was maintained between 38 and 42° C. and the polymerization reaction proceeded for approximately 120 minutes. The polymerization reaction was quenched by the addition of 0.7 g of a SMBS solution (16 wt. % in water) to the reactor to scavenge any remaining monomers. The reaction mixture cooled for approximately 30 minutes. The final product was isolated, precipitated from acetone, and dried to yield a solid polysaccharide-g-polyacrylamide friction reducer.

Comparative Example 1: Ungrafted Blend of Starch/Polyacrylamide

A physical blend of 9 wt. % potato starch with 91 wt. % dry polyacrylamides.
Characterization:
A synthetic seawater was prepared by dissolving 38.55 g of NaCl, 2.3 g of $CaCl_2 \cdot H_2O$, 7.83 g of $MgCl_2$, 6.06 g of $Na_2SO_4$, and 0.26 g of $NaHCO_3$ in 1 L of deionized water. The synthetic seawater had a total dissolved solids (TDS) value of about 57,000 mg/L. Solutions were prepared that contained Example 1 and 2 at concentrations of 0.9, 0.5, and 0.3 wt. % by dispersing the desired amount of Example 1 or 2 in either deionized (DI) water or synthetic seawater, as indicated.

Figure 3:
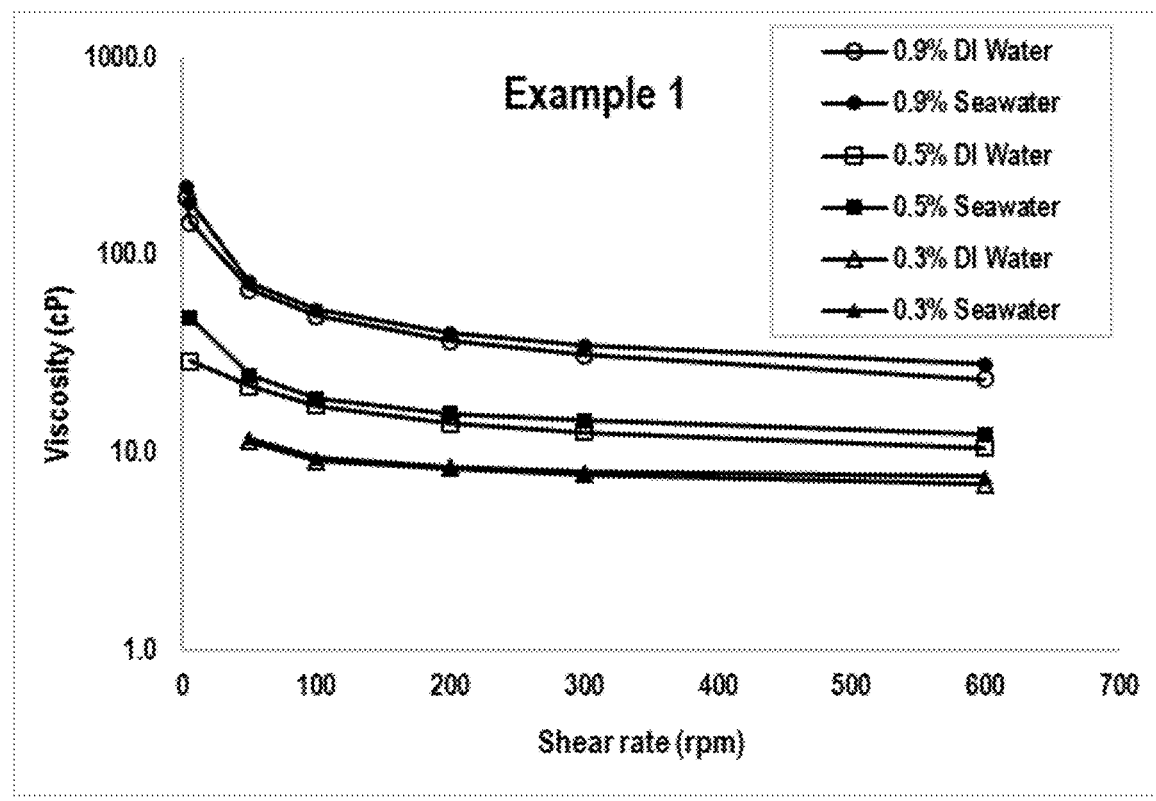
FIG. 3 is a plot of the Table 1 viscosity data utilizing polysaccharide-g-polyacrylamide as a friction reducer according to one or more embodiments.

For viscosity measurements, the viscosity of each solution was measured using a FANN 35 viscometer at 50, 100, 200, 300 and 600 RPM. The friction reduction performance of the examples was evaluated by a Miniflow loop, model 6500-M (Chandler Ametek). The flow rate was set at 4 gallons per minute with an injection pressure of about 35 psi. The tubing had a 3/8" outer diameter (OD) and a 0.28" inner diameter (ID).
Results and Discussion:
Table 1 includes experimentally-derived viscosity data of aqueous solutions utilizing both fresh water (deionized water or DI) and synthetic seawater (TDC of 57,000 mg/L) with polysaccharide-g-polyacrylamide as the friction reducer at various concentrations (Experiment 2) according to one or more embodiments. Viscosity values are provided at shear rates of 50, 100, 200, 300, and 600 RPM for three sets of concentrations. FIG. 3 is a plot of the Table 1 viscosity data utilizing polysaccharide-g-polyacrylamide as a friction reducer according to one or more embodiments.

TABLE 1

Viscosity data utilizing polysaccharide-g-polyacrylamide as a friction reducer according to one or more embodiments.

| | Example 1 - Viscosity (cP) | | | | | |
|---|---|---|---|---|---|---|
| | Synthetic seawater | | | DI water | | |
| Shear speed (RPM) | 0.9 wt. % | 0.5 wt. % | 0.3 wt. % | 0.9 wt. % | 0.5 wt. % | 0.3 wt. % |
| 50 | 72.6 | 24.7 | 11.7 | 66.9 | 21.7 | 11.3 |
| 100 | 53.0 | 18.8 | 9.4 | 49.3 | 17.2 | 9.1 |
| 200 | 40.4 | 15.8 | 8.5 | 36.6 | 14.1 | 8.3 |
| 300 | 34.9 | 14.6 | 8.0 | 31.3 | 12.7 | 7.7 |
| 600 | 27.9 | 12.4 | 7.6 | 23.5 | 10.6 | 6.9 |

Table 2 utilizes the data from Table 1 to determine a percentage increase (from base DI viscosity value) in viscosity value between the various DI polysaccharide-g-polyacrylamide solutions and the comparative synthetic seawater (SSW) polysaccharide-g-polyacrylamide solutions at similar shear rates and concentrations for Example 1.

TABLE 2 percentage increase in viscosity value of comparative SSW Example 1 versus DI Example 1 formulations.

| | Example 1 - Viscosity percentage of SSW over DI (%) | | |
|---|---|---|---|
| Shear speed (RPM) | 0.9 wt. % | 0.5 wt. % | 0.3 wt. % |
| 50 | +8.5 | +14.2 | +3.5 |
| 100 | +7.5 | +9.3 | +3.3 |
| 200 | +10.4 | +12.1 | +2.4 |
| 300 | +11.5 | +15.0 | +3.9 |
| 600 | +18.7 | +17.0 | +10.1 |

As shown in both Tables 1 and 2 and FIG. 3, at a given friction reducer concentrations (Example 1), the determined solution viscosity does not appear to be appreciably different regardless of the base fluid composition (fresh water versus synthetic seawater). For instance, when the friction reducer concentration is at 0.5 wt. %, the viscosity of Example 1 is about 14 centipoise (cP) in the synthetic seawater and 13 cP in fresh water at a shear rate of 300 RPM. The well-maintained viscosity in the synthetic seawater indicate that Example 1 possesses excellent salt tolerance. This permits the polysaccharide-g-polyacrylamide friction reducer to be used in high salinity base fluid for slickwater fracturing and not requiring modification to other usage parameters, simplifying use. It is believed that other friction reducers do not demonstrate such viscosity consistency at elevated salinity.

Figure 4:
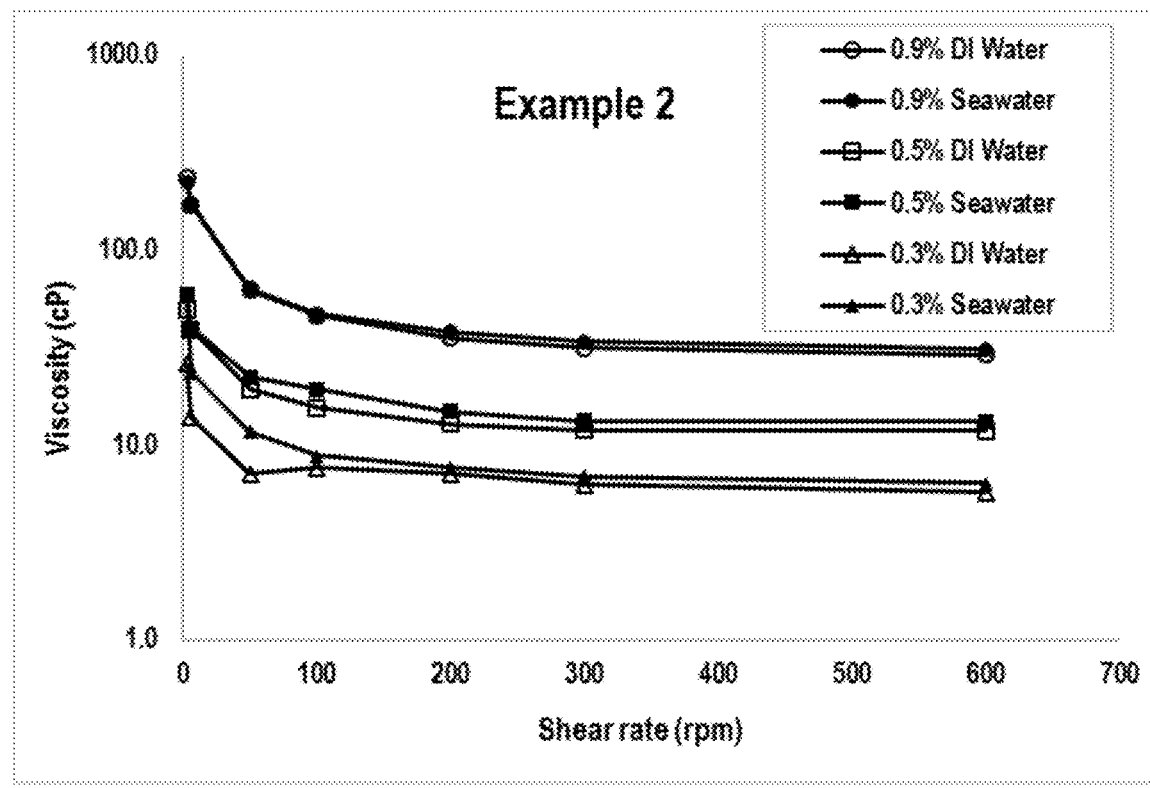
FIG. 4 is a plot of the Table 3 viscosity data utilizing guar-g-polyacrylamide as a friction reducer according to one or more embodiments.

Table 3 includes experimentally-derived viscosity data of aqueous solutions utilizing both fresh water (deionized water or DI) and synthetic seawater (TDC of 57,000 mg/L) with guar-g-polyacrylamide as the friction reducer at various concentrations (Experiment 2) according to one or more embodiments. Viscosity values are provided at shear rates of 50, 100, 200, 300, and 600 RPM for three sets of concentrations. FIG. 4 is a plot of the Table 2 viscosity data utilizing guar-g-polyacrylamide as a friction reducer according to one or more embodiments.

TABLE 3

Viscosity data utilizing guar-g-polyacrylamide as a friction reducer according to one or more embodiments.

| | Example 2 - Viscosity (cP) | | | | | |
|---|---|---|---|---|---|---|
| | Synthetic seawater | | | DI water | | |
| Shear speed (RPM) | 0.9 wt. % | 0.5 wt. % | 0.3 wt. % | 0.9 wt. % | 0.5 wt. % | 0.3 wt. % |
| 50 | 63.4 | 22.3 | 11.7 | 62.5 | 19.3 | 7.1 |
| 100 | 47.3 | 19.3 | 8.8 | 46.2 | 15.5 | 7.6 |
| 200 | 38.3 | 14.8 | 7.6 | 35.5 | 12.9 | 7.1 |
| 300 | 34.0 | 13.3 | 6.9 | 31.6 | 12.0 | 6.3 |
| 600 | 31.0 | 13.2 | 6.4 | 29.1 | 11.9 | 5.7 |

Table 4 utilizes the data from Table 3 to determine a percentage increase (from base DI viscosity value) in viscosity value between the various DI guar-g-polyacrylamide solutions and the comparative synthetic seawater (SSW) guar-g-polyacrylamide solutions at similar shear rates and concentrations for Example 2.

TABLE 4

Percentage increase in viscosity value of comparative SSW Example 2 versus DI Example 2 formulations.

| | Example 2 - Viscosity percentage of SSW over DI (%) | | |
|---|---|---|---|
| Shear speed (RPM) | 0.9 wt. % | 0.5 wt. % | 0.3 wt. % |
| 50 | +1.4 | +15.5 | +64.8 |
| 100 | +2.4 | +24.5 | +15.8 |
| 200 | +10.4 | +12.1 | +7.0 |
| 300 | +7.9 | +14.7 | +9.5 |
| 600 | +6.5 | +10.9 | +12.3 |

As shown in both Tables 3 and 4 and FIG. 4, a similar relationship to the viscosity profiles comparing fresh water and saltwater base fluids were seen using the guar-g-polyacrylamide friction reducer (Example 2) as was observed with Example 1. As well, there were similar viscosity values between Examples 1 and 2 at similar concentrations, indicating that the guar-g-polyacrylamide friction reducer is similarly useful for slickwater fracturing compositions. Although not wanting to be bound by theory, the similar viscosity results may indicate that the two friction reducers may be used in combination or could be substituted for each other, if necessary.

Figure 5:
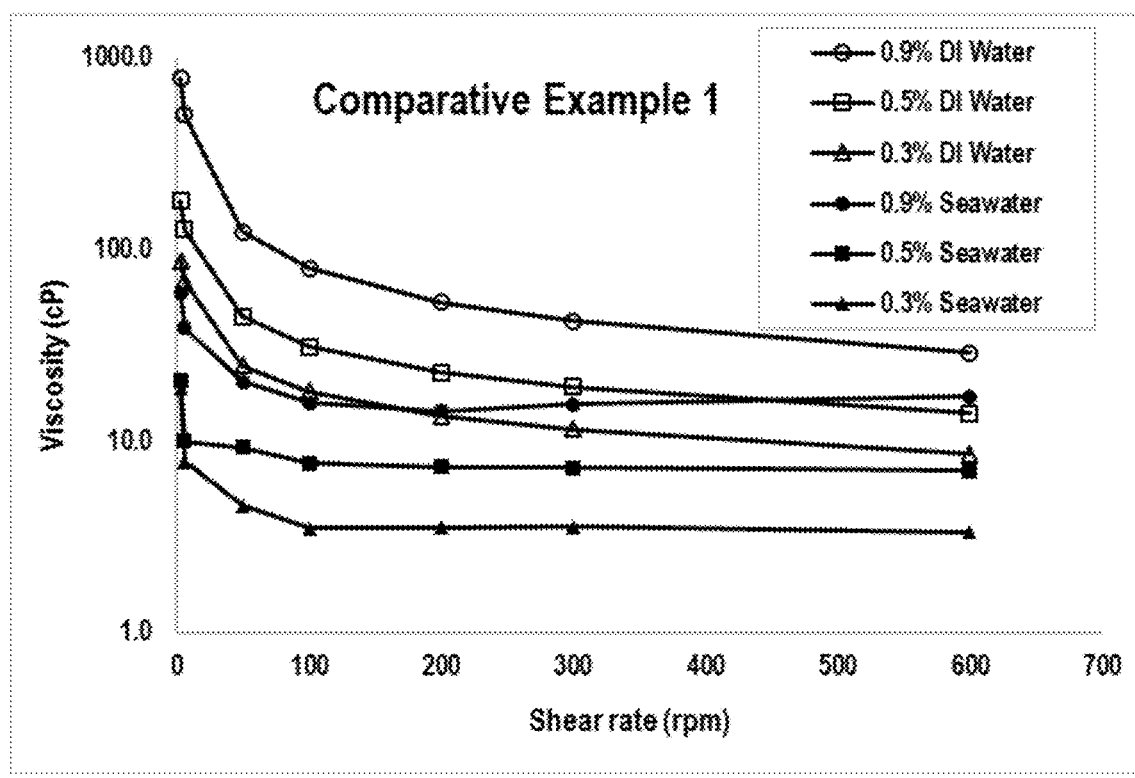
FIG. 5 is a plot of the Table 5 viscosity data utilizing a physical blend of starch with polyacrylamide as a friction reducer.

To confirm the effect of the covalent attachment of polyacrylamide to a polysaccharide backbone on salt tolerance, the viscosity data of a physical blend of starch with polyacrylamide (Comparative Example 1) is also measured. Table 5 includes experimentally-derived viscosity data of aqueous solutions utilizing both fresh water (deionized water or DI) and synthetic seawater (TDC of 57,000 mg/L) with the physical blend of physical blend of starch with polyacrylamide as the friction reducer at various concentrations (Comparative Example 1). Viscosity values are provided at shear rates of 50, 100, 200, 300, and 600 RPM for three sets of concentrations. FIG. 5 is a plot of the Table 5 viscosity data utilizing a physical blend of starch with polyacrylamide as a friction reducer.

TABLE 5

Viscosity data utilizing a physical blend of starch with polyacrylamide as a friction reducer.

| | Comparative Example 1 - Viscosity (cP) | | | | | |
|---|---|---|---|---|---|---|
| | Synthetic seawater | | | DI water | | |
| Shear speed (RPM) | 0.9 wt. % | 0.5 wt. % | 0.3 wt. % | 0.9 wt. % | 0.5 wt. % | 0.3 wt. % |
| 50 | 20.4 | 9.3 | 4.6 | 123.7 | 44.6 | 24.7 |
| 100 | 15.9 | 7.6 | 3.5 | 80.3 | 31.1 | 18.2 |
| 200 | 14.4 | 7.3 | 3.5 | 53.0 | 22.8 | 13.5 |
| 300 | 15.5 | 7.2 | 3.6 | 42.4 | 19.1 | 11.5 |
| 600 | 17.1 | 7.0 | 3.4 | 28.9 | 14.0 | 8.6 |

Table 6 utilizes the data from Table 5 to determine a percentage increase (from base DI viscosity value) in viscosity value between the various DI physical blend solutions and the comparative synthetic seawater (SSW) physical blend solutions at similar shear rates and concentrations for Comparative Example 1

TABLE 6

Percentage increase in viscosity value of comparative SSW Comparative Example 1 versus DI Comparative Example 1 formulations.

| | Comparative Example 1 - Viscosity percentage of SSW over DI (%) | | |
|---|---|---|---|
| Shear speed (RPM) | 0.9 wt. % | 0.5 wt. % | 0.3 wt. % |
| 50 | −83.5 | −79.1 | −81.4 |
| 100 | −80.2 | −75.6 | −80.8 |
| 200 | −72.8 | −68.0 | −74.1 |
| 300 | −63.4 | −62.3 | −68.7 |
| 600 | −40.8 | −50.0 | −60.5 |

As shown in both Tables 5 and 6 and FIG. 5, a significant reduction of solution viscosity is observed for Comparative Example 1 when the base fluid is changed from fresh water to synthetic seawater. A mere physical blend of starch with polyacrylamide (Comparative Example 1) does not have the same salt tolerance property as Examples 1 and 2 in the same concentrations in the same base fluids. The covalent attachment of polyacrylamide to a polysaccharide backbone, such as for Examples 1 and 2, are therefore believed to assist in maintaining a greater overall viscosity profile in saline fluids. The friction reducers of Examples 1 and 2 also show that they provide relatively stable viscosity should there be changes to the salinity in the base fluids.

The polysaccharide-g-polyacrylamide hybrid material (Example 1) also shows a greater viscosity in synthetic seawater than the physical blend (Comparative Example 1) at the same concentrations: 14 cP for Example 1 as compared with 7 cP for Comparative Example 1 at a shear rate of 300 RPM and a concentration of 0.5 wt. %. This greater viscosity for Example 1 indicates the capacity to carry a greater amount of solids than the mere physical blend of Comparative Example 1.

Additional experimentation was performed with Examples 1 and 2 and Comparative Example 1. Friction reduction performance was evaluated through a flow loop study as previously described. The friction reduction was determined based upon the comparison of fluid with friction reducer incorporated versus the base fluid, such as synthetic seawater, without the friction reducer. The fluid flow rate through the testing apparatus was about 4 gallons per minute.

The friction reduction performance of Examples 1 and 2 were measured and both embodiment friction reducers exhibited good friction reduction performance at similar testing conditions. Both Examples 1 and 2 demonstrated a friction reduction of about 70% in synthetic seawater at a concentration level of 0.05 wt. %.

In summary, friction reducers based on a hybrid material of polysaccharide and polyacrylamide (polysaccharide-g-polyacrylamide) provide both high friction reduction as well as improved salt tolerance. This contrasts with a mere physical blends of the components that simply cannot maintain solution viscosity in seawater.

Unless defined otherwise, all technical and scientific terms used have the same meaning as commonly understood by one of ordinary skill in the art to which these systems, apparatuses, methods, processes, and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

Although only a few example embodiments have been described in detail, those skilled in the art will readily appreciate that many modifications are possible in the example embodiments without materially departing from this disclosure. All modifications of one or more disclosed embodiments are intended to be included within the scope of this disclosure as defined in the following claims. In the claims, means-plus-function clauses are intended to cover the structures previously described as performing the recited function and not only structural equivalents, but also equivalent structures. It is the express intention of the applicant not to invoke 35 U.S.C. § 112(f) for any limitations of any of the claims, except for those in which the claim expressly uses the words 'means for' together with an associated function.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open-ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of." The words "comprise," "has," and "include" and all grammatical variations thereof are each intended to have an open, non-limiting meaning that does not exclude additional elements or steps.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed is:

1. A friction reducer comprising a polysaccharide-graft-water-soluble polymer (polysaccharide-g-water-soluble polymer),
where a portion of the friction reducer that is polysaccharide is in a range of from about 1 to 15% by weight (wt. %), and
where a first aqueous solution comprising the friction reducer as compared to a second aqueous solution comprising the friction reducer has a difference in rotational viscosity values at a shear speed of about 300 revolutions per minute (RPM) in a range of from about 0.01 to 25%, where a concentration of the friction reducer in both the first aqueous solution and the second aqueous solution is the same and where a total dissolved solids (TDS) in the first aqueous solution is greater than 50,000 mg/L and in the second aqueous solution is less than 1,000 mg/L.

2. The friction reducer of claim 1, where the polysaccharide of the friction reducer is selected from the group consisting of guar gum, starch, cellulose, dextran, xanthan, chitin, scleroglucan, chitosan, gellan gum, arabic gum, alginate, curdlan, hyaluronic acid, lentinan, levan, pullulan, schizophyllan, stewartan, succinoglycan, welan, derivatives thereof, and combinations thereof.

3. The friction reducer of claim 1, where the water-soluble polymer of the friction reducer is selected from the group consisting of a homopolymer or a copolymer, where the water-soluble polymer is a polymerization product of at least one water-soluble monomer.

4. The friction reducer of claim 3, where the at least one water-soluble monomer is selected from the group consisting of acrylamides, acrylates, acetates, acetamides, formamides, (meth)acrylamides, $C_1$-$C_3$N-alkyl(meth)acrylamide, N,N-dimethylacrylamide, dimethyl(meth)acrylamide, N-vinylpyrrolidone, N-vinyl acetamide, 4-acryloylmorpholine, N-isopropylacrylamide, N-(hydroxymethyl)acrylamide, N-(hydroxyethyl)acrylamide, N-[tris(hydroxymethyl)methyl]acrylamide, N-vinyl acetate, N-vinyl formamide, and derivatives thereof.

5. The friction reducer of claim 3, where the copolymer is a polymerization product of at least one water-soluble monomer and at least one functional monomer.

6. The friction reducer of claim 5, where the at least one functional monomer is selected from the group consisting of a cationic monomer and an anionic monomer.

7. The friction reducer of claim 6, where the cationic monomer is selected from the group consisting of (meth)acrylamidopropyltrimethyl ammonium halides, (meth)acryloyloxyethyltrimethyl ammonium halides, (meth)acryloyloxyethyltrimethyl ammonium methyl sulfates, diallyl dimethyl ammonium halides, diallylamines, methyldiallylamines, dimethylaminoethylmethacrylates, dimethylaminopropylmethacrylamides, derivatives thereof, and combinations thereof.

8. The friction reducer of claim 6, where the anionic monomer is selected from the group consisting of (meth)acrylic acid, salts of (meth)acrylic acid, acrylic acid, sodium acrylate, ammonium acrylate, methacrylic acid, sodium methacrylate; 2-acrylamido-2-methylpropanesulfonic acid (AMPS), sodium salt of AMPS; vinyl sulfonic acid, salts of vinyl sulfonic acid, sodium vinyl sulfonate, styrene sulfonic acid, salts of styrene sulfonic acid; sulfomethylated acrylamide, allyl sulfonate, vinylphosphonic acid, allylphosphonic acid, phosphonomethylated acrylamide, derivatives thereof, and combinations thereof.

9. The friction reducer of claim 1, where the friction reducer is selected from the group consisting of starch-g-polyacrylamide, guar-g-polyacrylamide, and combinations thereof.

10. The friction reducer of claim 1, where an aqueous solution comprising 0.5 wt. % of the friction reducer as compared to a similar aqueous solution that does not comprise the friction reducer has an amount of friction reduction in a range of from about 50% to about 85%.

11. A wellbore treatment fluid, comprising:
an aqueous base fluid; and
a friction reducer, where the friction reducer comprises a polysaccharide-graft-water-soluble polymer (polysaccharide-g-water-soluble polymer),
where a portion of the friction reducer that is polysaccharide is in a range of from about 1 to 15% by weight (wt. %), and
where a first aqueous solution comprising the friction reducer as compared to a second aqueous solution comprising the friction reducer has a difference in rotational viscosity values at a shear speed of about 300 revolutions per minute (RPM) in a range of from about 0.01 to 25%, where a concentration of the friction reducer in both the first aqueous solution and the second aqueous solution is the same and where a total dissolved solids (TDS) in the first aqueous solution is greater than 50,000 mg/L and in the second aqueous solution is less than 1,000 mg/L;
where an amount of the friction reducer in the wellbore treatment fluid is in a range of from about 0.01 to 10 wt. % (weight percent).

12. The wellbore treatment fluid of claim 11, where the water-soluble polymer of the friction reducer is selected from the group consisting of a homopolymer or a copolymer, where the water-soluble polymer is a polymerization reaction product of at least one water-soluble monomer.

13. The wellbore treatment fluid of claim 12, where the copolymer is a polymerization product of at least one water-soluble monomer and at least one functional monomer.

14. The wellbore treatment fluid of claim 11, where the aqueous base fluid is a synthetic or natural seawater or brine having a total dissolved solids (TDS) content in a range of from about 1,000 to 350,000 mg/L (milligrams per liter).

15. The wellbore treatment fluid of claim 11, where the friction reducer is selected from the group consisting of starch-g-polyacrylamide, guar-g-polyacrylamide, and combinations thereof.

16. A method of using a wellbore treatment fluid, comprising:
introducing the wellbore treatment fluid into the wellbore, the wellbore treatment fluid comprising an aqueous base fluid and a friction reducer, where the friction reducer comprises a polysaccharide-graft-water-soluble polymer (polysaccharide-g-water-soluble polymer),
where a portion of the friction reducer that is polysaccharide is in a range of from about 1 to 15% by weight (wt. %), and where a first aqueous solution comprising the friction reducer as compared to a second aqueous solution comprising the friction reducer has a difference in rotational viscosity values at a shear speed of about 300 revolutions per minute (RPM) in a range of from about 0.01 to 25%, where a concentration of the friction reducer in both the first aqueous solution and the second aqueous solution is the same and where a total dissolved solids (TDS) in the first aqueous solution is greater than 50,000 mg/L and in the second aqueous solution is less than 1,000 mg/L;

where an amount of the friction reducer in the wellbore treatment fluid is in a range of from about 0.01 to 10 wt. % (weight percent).

17. The method of claim 16, where the introduction of the wellbore treatment fluid is at a pressure greater than the fracture pressure of a hydrocarbon-bearing formation in fluid communication with the wellbore.

18. The method of claim 16, where the friction reducer is selected from the group consisting of starch-g-polyacrylamide, guar-g-polyacrylamide, and combinations thereof, and where the aqueous base fluid is a synthetic seawater.

* * * * *